(12) United States Patent
Kim et al.

(10) Patent No.: US 12,434,193 B2
(45) Date of Patent: Oct. 7, 2025

(54) FEED SPACER FOR REDUCING DIFFERENTIAL PRESSURE OF REVERSE OSMOSIS ELEMENT, AND FORMATION NOZZLE

(71) Applicant: LG CHEM, LTD., Seoul (KR)

(72) Inventors: Taehyeong Kim, Daejeon (KR); Taeyoung Park, Daejeon (KR); Phill Lee, Daejeon (KR); Dae Hun Kim, Daejeon (KR); Kyunghoon Min, Daejeon (KR)

(73) Assignee: LG CHEM, LTD., Seoul (KR)

(*) Notice: Subject to any disclaimer, the term of this patent is extended or adjusted under 35 U.S.C. 154(b) by 798 days.

(21) Appl. No.: 17/598,566

(22) PCT Filed: Mar. 17, 2020

(86) PCT No.: PCT/KR2020/003568
§ 371 (c)(1),
(2) Date: Sep. 27, 2021

(87) PCT Pub. No.: WO2020/197141
PCT Pub. Date: Oct. 1, 2020

(65) Prior Publication Data
US 2022/0193610 A1    Jun. 23, 2022

(30) Foreign Application Priority Data
Mar. 28, 2019   (KR) .................. 10-2019-0035633

(51) Int. Cl.
*B01D 61/10*   (2006.01)
*B01D 61/02*   (2006.01)
(Continued)

(52) U.S. Cl.
CPC .......... *B01D 61/10* (2013.01); *B01D 61/025* (2013.01); *B01D 63/101* (2022.08); *C02F 1/441* (2013.01); *B01D 2313/143* (2013.01)

(58) Field of Classification Search
CPC .... B01D 61/10; B01D 61/025; B01D 63/101; B01D 2313/143; B01D 2313/14;
(Continued)

(56) References Cited

U.S. PATENT DOCUMENTS 3,067,084 A * 12/1962 Nalle, Jr. .............. B29C 48/345
                                                          425/464
3,551,543 A * 12/1970 Martin ................... B29C 48/05
                                                          264/41
(Continued)

FOREIGN PATENT DOCUMENTS

JP    H05-168869         7/1993
JP    3098600 B2 *     10/2000
(Continued)

*Primary Examiner* — Jonathan M Peo
(74) *Attorney, Agent, or Firm* — Bryan Cave Leighton Paisner LLP

(57) ABSTRACT

Provided is a feed spacer for reducing differential pressure of a reverse osmosis element, the feed spacer forming the reverse osmosis element, the feed spacer comprising a plurality of strands disposed in a mesh shape having predetermined intersection points, and wherein a vertical cross section of each of the strands has a rhombic shape such that a pressure loss in the feed spacer is minimized by an effective flow of raw water at an interface of a reverse osmosis membrane, and a nozzle for forming the feed spacer.

5 Claims, 3 Drawing Sheets

(51) Int. Cl.
*B01D 63/10* (2006.01)
*C02F 1/44* (2023.01)

(58) Field of Classification Search
CPC .... B01D 63/10; B01D 69/085; B01D 69/082; B01D 61/08; C02F 1/441; C02F 2103/08; C02F 2201/002; Y02A 20/131; D01D 4/027; D01D 5/253
See application file for complete search history.

(56) References Cited

U.S. PATENT DOCUMENTS

| | | | |
|---|---|---|---|
| 3,709,367 A * | 1/1973 | Martinez | B01D 63/10 |
| | | | 210/321.74 |
| 3,985,481 A * | 10/1976 | Brackmann | D01D 4/025 |
| | | | 425/464 |
| 4,902,417 A * | 2/1990 | Lien | B01D 63/101 |
| | | | 210/321.74 |
| 8,303,815 B2 | 11/2012 | Beppu et al. | |
| 9,616,390 B2 | 4/2017 | Hirozawa et al. | |
| 2003/0205520 A1 | 11/2003 | Johnson | |
| 2007/0175812 A1* | 8/2007 | Chikura | B01D 63/10 |
| | | | 210/321.88 |
| 2008/0190836 A1* | 8/2008 | Beppu | B01D 63/101 |
| | | | 210/321.74 |
| 2013/0341264 A1 | 12/2013 | Kidwell | |
| 2014/0231332 A1 | 8/2014 | Hirozawa et al. | |
| 2015/0068971 A1 | 3/2015 | Koiwa et al. | |
| 2015/0144550 A1* | 5/2015 | Okamoto | B01D 63/107 |
| | | | 210/497.1 |
| 2018/0207586 A1 | 7/2018 | Choi et al. | |
| 2019/0009220 A1 | 1/2019 | Matsuda et al. | |

FOREIGN PATENT DOCUMENTS

| | | |
|---|---|---|
| JP | 2004-050005 | 2/2004 |
| JP | 2005-305422 | 11/2005 |
| JP | 2007-117949 | 5/2007 |
| JP | 2017-064629 | 4/2017 |
| JP | 2017-119237 | 7/2017 |
| JP | 6242887 | 12/2017 |
| KR | 10-2007-0031279 | 3/2007 |
| KR | 10-2014-0082677 | 7/2014 |
| KR | 10-2015-0035772 | 4/2015 |
| KR | 10-2017-0023625 | 3/2017 |
| KR | 10-2017-0038646 | 4/2017 |
| KR | 10-1870307 | 6/2018 |

* cited by examiner

[Figure 1]
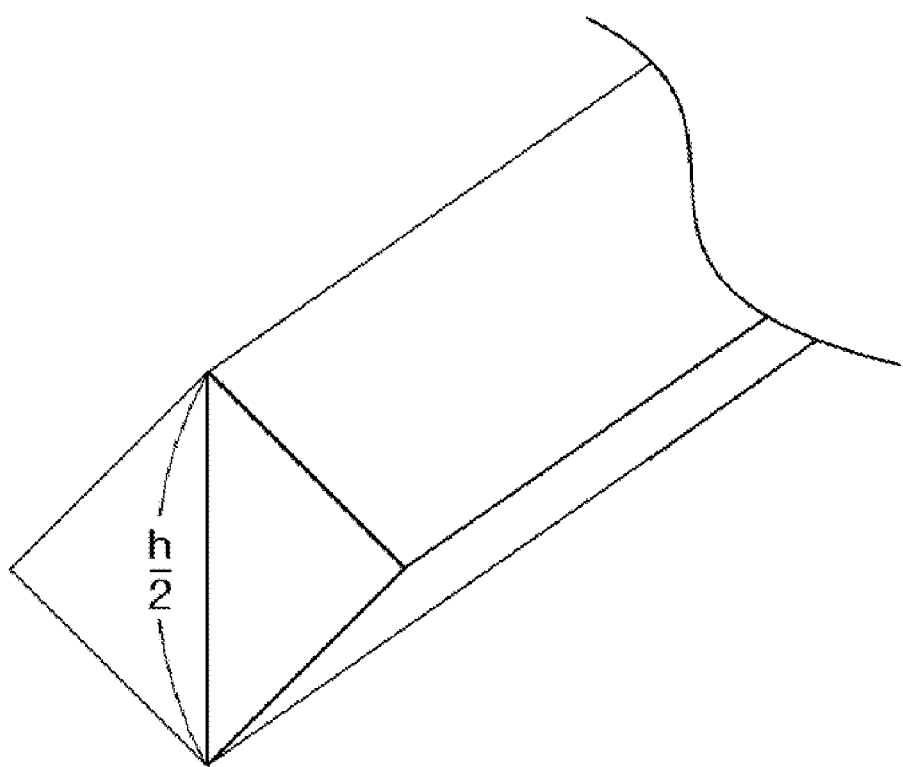

[Figure 2]
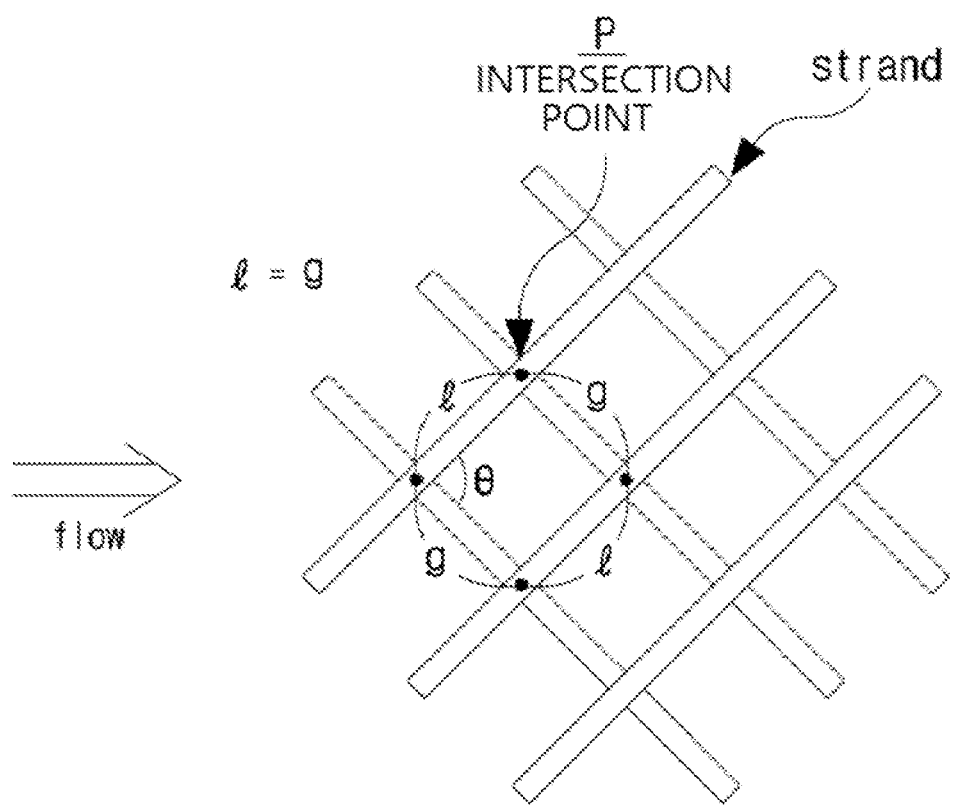

[Figure 3]
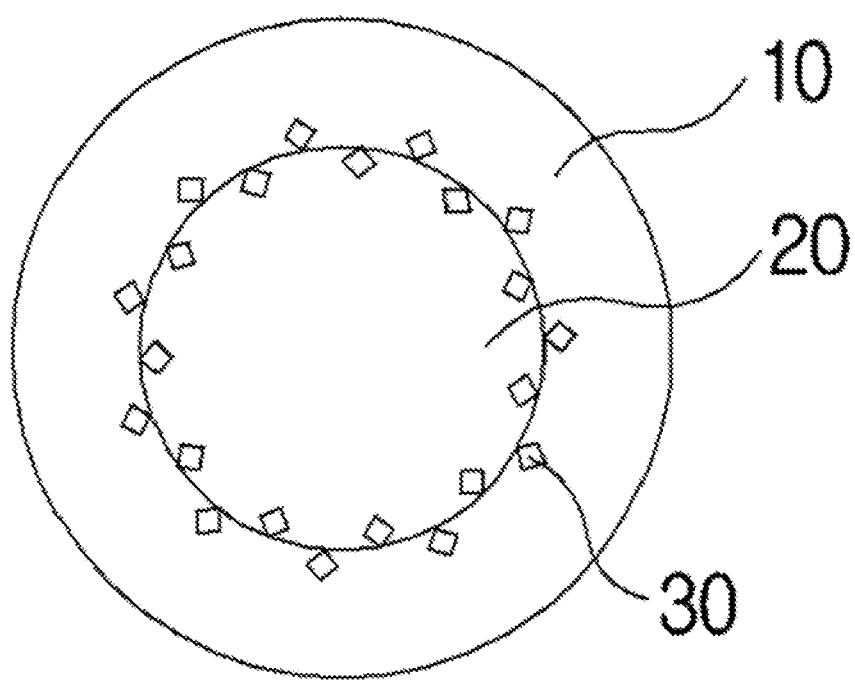

FEED SPACER FOR REDUCING DIFFERENTIAL PRESSURE OF REVERSE OSMOSIS ELEMENT, AND FORMATION NOZZLE

CROSS-REFERENCE TO RELATED APPLICATION(S)

This application is a National Stage Application of International Application No. PCT/KR2020/003568 filed on Mar. 17, 2020, which claims priority to and the benefit of Korean Patent Application No. 10-2019-0035633 filed with the Korean Intellectual Property Office on Mar. 28, 2019, the entire contents of which are incorporated herein by reference.

TECHNICAL FIELD

The present invention relates to a feed spacer for reducing differential pressure in a reverse osmosis element and a nozzle for forming the same, and more particularly, to a feed spacer for reducing differential pressure in a reverse osmosis element, in which a cross section of the feed spacer, which constitutes the reverse osmosis element, has a rhombic shape, such that a pressure loss in the feed spacer is minimized by an effective flow of raw water at an interface of a reverse osmosis membrane, and a nozzle for forming the feed spacer.

BACKGROUND

Earth is a planet where water occupies 70% of the surface thereof. Seawater accounts for 97.5% of the total amount of water, and the seawater cannot be used as drinking water. Accordingly, a seawater desalination technology has been developed which removes salt dissolved in seawater and converts seawater into fresh water that can be used as drinking water. In the past, a method of producing pure water by boiling seawater and collecting moisture vapor was used. However, recently, a method for producing pure water using a reverse osmosis filter has been used as a core technique for seawater desalination.

Unlike osmosis in which water moves from a site with a low concentration to a site with a high concentration, the reverse osmosis is a phenomenon in which pressure is applied to a high-concentration solution to move water to a low-concentration solution. While coarse salt or contaminants cannot pass through the filter, only water passes through the filter, such that pure and clean water can be obtained. The reverse osmosis is used in various fields for producing sterile water for medical use, purified water, and water for semiconductor manufacturing.

A reverse osmosis element using the reverse osmosis has been used. The reverse osmosis element is configured by stacking a plurality of reverse osmosis membranes, a plurality of feed spacers, and a plurality of transmissive spacers. The reverse osmosis element surrounds a water collecting pipe. When raw water is supplied to one side of the reverse osmosis element, even fine contaminants less than nanometers are filtered out by the reverse osmosis membrane while the raw water flows along the feed spacers, and permeable water is taken out from the other side of the reverse osmosis element. The permeable water filtered by the reverse osmosis membrane flows along the transmissive spacers, flows into holes in the water collecting pipe, and then flows in the water collecting pipe. Therefore, in order to reduce a pressure loss when the raw water flows, the reverse osmosis element has a structure capable of withstanding high pressure.

In general, a mesh-shaped spacer is used as the feed spacer, such that a flow path of the raw water is ensured to increase a flow of raw water, thereby mitigating ion polarization occurring at an interface of the reverse osmosis membrane. However, when the flow of raw water increases, physical properties such as salt removal rate and transmittance of the permeable water are improved, but a pressure loss occurs due to an increase in flow friction. As a result, there is a problem in that differential pressure increases, which causes an increase in operating costs.

BRIEF DESCRIPTION

Technical Problem

The present invention has been made in an effort to solve the above-mentioned problem, and an object of the present invention is to provide a feed spacer for reducing differential pressure in a reverse osmosis element, the feed spacer having a vertical cross section having a rhombic shape that can reduce differential pressure in the reverse osmosis element by creating an effective flow of raw water at an interface of the reverse osmosis membrane.

Another object of the present invention is to provide a nozzle for forming a feed spacer for reducing differential pressure in a reverse osmosis element, the nozzle being capable of forming the feed spacer having a vertical cross section having a rhombic shape that can reduce differential pressure in the reverse osmosis element.

Technical Solution

A feed spacer for reducing differential pressure in a reverse osmosis element according to the present invention is a feed spacer in which a plurality of strands is disposed in a mesh shape to have predetermined intersection points, and a vertical cross section of the strand has a rhombic shape.

In addition, the strands can form a mesh having a two-layer structure.

In addition, an angle at one side of the intersection point between the strands can be 80° or smaller.

In addition, lengths between the intersection points between the strands can all be equal to one another, and a thickness of the feed spacer can be constant.

In addition, the differential pressure in the reverse osmosis element can decrease as a ratio of the length between the intersection points between the strands to the thickness of the feed spacer increases.

A nozzle for forming a feed spacer for reducing differential pressure in a reverse osmosis element according to the present invention can form the feed spacer according to the present invention.

In addition, the nozzle can have a dual structure.

In addition, the nozzle can have one or more rhombic slots.

In addition, a length between the slots can be adjustable.

In addition, a size of the slot can be adjustable.

Advantageous Effects

According to the present invention, it is possible to reduce costs required to operate the reverse osmosis element by providing the feed spacer having a vertical cross section having a rhombic shape that can reduce differential pressure and mitigate ion polarization by creating an effective flow of raw water at the interface of the reverse osmosis membrane of the reverse osmosis element.

In addition, it is possible to provide the nozzle for forming the feed spacer, the nozzle being capable of forming the feed spacer having a vertical cross section having a rhombic shape that can reduce differential pressure in the reverse osmosis element.

BRIEF DESCRIPTION OF THE DRAWINGS

FIG. 1 is a perspective view of a strand according to an exemplary embodiment of the present invention.

FIG. 2 is a perspective view of a feed spacer for reducing differential pressure in a reverse osmosis element according to the exemplary embodiment of the present invention.

FIG. 3 is a cross-sectional view of a nozzle 100 for forming a feed spacer for reducing differential pressure in a reverse osmosis element according to the exemplary embodiment of the present invention.

DETAILED DESCRIPTION

Hereinafter, the present invention will be described in detail with reference to the accompanying drawings. Here, repeated descriptions and detailed descriptions of publicly-known functions and configurations, which can unnecessarily obscure the subject matter of the present invention, will be omitted. Exemplary embodiments of the present invention are provided to completely explain the present invention to a person with ordinary skill in the art. Therefore, shapes and sizes of elements illustrated in the drawings can be exaggerated for a more apparent description.

Throughout the specification, unless explicitly described to the contrary, the word "comprise" or "include" and variations, such as "comprises", "comprising", "includes" or "including", will be understood to imply the inclusion of stated constituent elements, not the exclusion of any other constituent elements.

Hereinafter, exemplary embodiments are proposed to help understand the present invention. However, the following exemplary embodiments are provided just for more easily understanding the present invention, and the contents of the present invention are not limited by the exemplary embodiments.

FIG. 1 is a perspective view of a strand according to an exemplary embodiment of the present invention, and FIG. 2 is a perspective view of a feed spacer for reducing differential pressure in a reverse osmosis element according to the exemplary embodiment of the present invention.

A reverse osmosis element can be configured by stacking a plurality of reverse osmosis membranes, a plurality of feed spacers, and a plurality of transmissive spacers and can surround a water collecting pipe. The feed spacer is positioned between the reverse osmosis membranes and maintains a constant interval between the reverse osmosis membranes. The feed spacer can serve to block a surface of the reverse osmosis membrane in order to filter out contaminants contained in raw water introduced through the reverse osmosis membrane. Therefore, in order to enable contaminants contained in the raw water to flow without being collected, the feed spacer can have a mesh shape made by a plurality of strands arranged to have predetermined intersection points. In this case, a material of the strand can be any one of, but not particularly limited to, polyethylene (PE), polyvinyl chloride (PVC), polyester, polypropylene (PP), and a mixture of two or more polymers. In addition, the strand can have a vertical cross section having a rhombic shape. The rhombic shape can have a smaller area than a circular or quadrangular shape when the thickness remains the same. Therefore, a flow path in the feed spacer including the strands each having the vertical cross section having the rhombic shape can be increased, such that flow resistance against the reverse osmosis element can be reduced, thereby reducing differential pressure.

The mesh shape of the feed spacer according to the present invention can have a two-layer structure. First, some strands are disposed in parallel at predetermined intervals in a direction inclined with respect to a flow direction of raw water. Thereafter, the remaining strands are disposed in parallel at predetermined intervals on the previous strands in a reversely inclined direction symmetrical to the inclined direction in order to form the intersection points. The mesh shape can be a parallelogrammatic shape having identical sides based on positions of the disposed strands. In this case, an angle θ of the parallelogram with respect to the flow direction of the raw water is 80° or less. The flow of raw water is not separated from the strands well. The flow of raw water is separated after the raw water flows along the strands for a comparatively long period of time, and then the flow of raw water spreads. When flow diffusion of the raw water is large, the raw water is uniformly supplied to the interface of the reverse osmosis membrane, and the flows of the raw water are mixed, such that the ion polarization can be reduced, and the flow resistance of the raw water can be reduced, thereby reducing the differential pressure in the reverse osmosis element. When the angle θ of the parallelogram exceeds 80°, the flow of raw water is easily separated from the strands, and the flow of raw water is hardly spread.

Meanwhile, since the feed spacer has the mesh shape with the parallelogrammatic shape having the identical sides, lengths l and g of the portions of the strands between the intersection points p are equal to one another. A thickness of a layer of the strand has a constant value of h/2, and a thickness of the feed spacer, which is made by positioning the strands in two layers, has a constant value of h. The length l or g between the intersection points p between the strands can be, but is not particularly limited to, 2 to 5 mm. If the length l or g is smaller than 2 mm, the ion polarization is inhibited, but a pressure loss is increased in the feed spacer. In contrast, if the length l or g is larger than 5 mm, a pressure loss is decreased in the feed spacer, but the ion polarization occurs, which can result in a deterioration in performance of the reverse osmosis element. The thickness h of the feed spacer can be, but not particularly limited to, 0.5 to 2.0 mm. If the thickness h is smaller than 0.5 mm, the flow path can be clogged with foreign substances contained in the raw water or power required for a pump for pumping the raw water can be increased. In contrast, if the thickness h is larger than 2.0 mm, an area of the reverse osmosis membrane of the reverse osmosis element is decreased, which can result in a decrease in performance of the reverse osmosis membrane. As described above, the differential pressure in the feed spacer can be reduced since a pressure loss is decreased as a value of a ratio (l/h) of the length l or g between the intersection points p between the strands to the thickness h of the feed spacer is increased within the range of the length l or g between the intersection points p between the strands and the range of the thickness h of the feed spacer.

FIG. 3 is a cross-sectional view of a nozzle 100 for forming a feed spacer for reducing differential pressure in a reverse osmosis element according to the exemplary embodiment of the present invention.

The nozzle 100 for forming a feed spacer for reducing differential pressure in a reverse osmosis element can include an outer nozzle 10, an inner nozzle 20, and slots 30.

The nozzle 100 for forming a feed spacer for reducing differential pressure in a reverse osmosis element according to the present invention can form the feed spacer for reducing differential pressure in a reverse osmosis element according to the present invention by discharging any one of polyethylene (PE), polyvinyl chloride (PVC), polyester, polypropylene (PP), and a mixture of two or more polymers which are used as the material of the strand.

The nozzle 100 for forming a feed spacer for reducing differential pressure in a reverse osmosis element can have a dual structure including the outer nozzle 10 and the inner nozzle 20. The plurality of slots 30 is positioned at a portion where the outer nozzle 10 and the inner nozzle 20 are in contact with each other, and each of the plurality of slots 30 is used to form a cross section of the strand. When the outer nozzle 10 and the inner nozzle 20 engage with each other and rotate, distances between the plurality of slots 30 can be adjusted, and thus the length l or g between the intersection points p between the strands can also be adjusted. Further, the slot 30 can be designed to have a rhombic shape, thereby forming the strand. An area of the strand to be formed also varies depending on a size of the slot 30, and the thickness h of the feed spacer can increase as the size of the slot 30 increases.

Comparative Example 1

Differential pressure was measured in a feed spacer which was made by a nozzle of a type having a quadrangular shape and had a mesh in which an angle θ of a parallelogram was 90° with respect to a flow direction of raw water.

Comparative Example 2

Differential pressure was measured in a feed spacer which was made by a nozzle of a type having a circular shape and had a mesh in which an angle θ of a parallelogram was 90° with respect to a flow direction of raw water.

Comparative Example 3

Differential pressure was measured in a feed spacer which was made by a nozzle of a type having a quadrangular shape and had a mesh in which an angle θ of a parallelogram was 75° with respect to a flow direction of raw water.

Comparative Example 4

Differential pressure was measured in a feed spacer which was made by a nozzle of a type having a quadrangular shape and had a mesh in which an angle θ of a parallelogram was 75° with respect to a flow direction of raw water.

Example 1

Differential pressure was measured in a feed spacer which was made by a nozzle of a type having a rhombic shape and had a mesh in which an angle θ of a parallelogram was 75° with respect to a flow direction of raw water.

Example 2

Differential pressure was measured in a feed spacer which was made by a nozzle of a type having a rhombic shape and had a mesh in which an angle θ of a parallelogram was 80° with respect to a flow direction of raw water.

TABLE 1

| | Θ (°) | L = g (mm) | l/h | Differential Pressure (psi) | Nozzle Type |
|---|---|---|---|---|---|
| Comparative Example 1 | 90 | 2.90 | 3.37 | 3.94 | Quadrangle |
| Comparative Example 2 | 90 | 3.70 | 4.30 | 2.33 | Circle |
| Comparative Example 3 | 75 | 2.92 | 3.40 | 2.96 | Quadrangle |
| Comparative Example 4 | 75 | 3.52 | 4.09 | 2.79 | Quadrangle |
| Example 1 | 75 | 4.63 | 5.38 | 1.83 | Rhombus |
| Example 2 | 80 | 3.80 | 4.49 | 2.03 | Rhombus |

In order to measure a change in differential pressure in the feed spacer, the elements including the Comparative Examples and the Examples were used. In this case, the element is a standard element with a diameter of 8 inches, and an effective membrane area is 37 m². Further, the raw water containing NaCl of 2,000 ppm flows at a raw water pressure of 225 psi to the element, and the differential pressure is a value measured when an average flow rate (an arithmetic mean of a flow rate of raw water and a flow rate of permeable water) is 44 GPM.

The vertical cross sections of the strands formed by the types of nozzles according to the Examples and the Comparative Examples are equal to the shapes of the types of nozzles. Therefore, referring to Table 1, the strands according to Comparative Examples 1 to 4 had the vertical cross sections having the quadrangular shape and the circular shape in the related art, and in Examples 1 and 2, the strands having the vertical cross sections having the rhombic shapes according to the present invention were used.

First, when comparing Comparative Examples 1 and 3, the nozzle types have the same quadrangular shape, and the angle θ of the parallelogram of the mesh with respect to the flow direction of the raw water is 90° in Comparative Example 1 and 75° in Comparative Example 3. In this case, the differential pressure was 3.94 psi in Comparative Example 1 and 2.96 psi in Comparative Example 3. Therefore, it can be ascertained that the differential pressure in the feed spacer is reduced when the angle θ is 80° or smaller.

When comparing Comparative Example 3 and Example 1, the angles θ of the parallelogram with respect to the flow direction of the raw water are the same as each other and are 75°. In Comparative Example 3, the ratio (l/h) of the length l between the intersection points between the strands to the thickness of the feed spacer is 3.40 when the length l is 2.92 mm. In Example 1, the ratio (l/h) of the length l between the intersection points between the strands to the thickness of the feed spacer is 5.38 when the length l is 4.63 mm. In this case, the differential pressure was 2.96 psi in Comparative Example 3 and 1.83 psi in Example 1. Therefore, it can be ascertained that the differential pressure of the feed spacer decreases when the ratio (l/h) of the length l between the intersection points between the strands to the thickness of the feed spacer increases.

When comparing Comparative Example 4 and Example 2, Comparative Example 4 and Example 2 have similar ratios (l/h) of the length l between the intersection points between the strands to the thickness of the feed spacer, and the vertical cross section of the strand is a quadrangular shape in Comparative Example 4 and a rhombic shape in Example 2. In addition, the angle θ of the parallelogram in Comparative Example 4 is 75°, and the angle θ of the parallelogram in Example 2 is 80° which is a value increased from the angle in Comparative Example 4. In this case, the differential pressure was 2.79 psi in Comparative Example 4 and 2.03 psi in Example 2. Therefore, it can be ascertained that when the vertical cross section of the strand has a rhombic shape, the differential pressure in the feed spacer is decreased even though the angle θ of the parallelogram of the mesh with respect to the flow direction of the raw water is increased.

That is, it can be ascertained that the use of the design of the strand having the rhombic shape according to the present invention reduces the differential pressure in the feed spacer. In addition, it can be ascertained that the differential pressure in the feed spacer is decreased when the angle θ between the intersection points between the strands is 80° or smaller and the ratio (l/h) of the length l between the intersection points between the strands to the thickness of the strand is increased.

While the present invention has been described above with reference to the exemplary embodiments, it can be understood by those skilled in the art that the present invention can be variously modified and changed without departing from the spirit and scope of the present invention disclosed in the claims.

The invention claimed is:

1. A feed spacer for reducing differential pressure in a reverse osmosis element, comprising a plurality of strands disposed in a mesh shape having predetermined intersection points, the plurality of strands forming a mesh having a two-layer structure, wherein a first set of the plurality of strands form a first layer, and a second set of the plurality of strands are disposed on the first layer forming a second layer,
   wherein a vertical cross section of each of the strands of the first layer and the second layer has a rhombic shape having four sides that meet to form four vertexes, and a thickness of the first set of strands and a thickness of the second set of strands has a constant value of h/2, measured from a first vertex to an opposite non-adjacent second vertex of the rhombic shape,
   wherein a thickness of the feed spacer has a constant value of h when the second layer is disposed on the first layer,
   a length between the intersection points between the strands is 3.8 to 4.63 mm, the thickness of the feed spacer is 0.5 to 2.0 mm, and the differential pressure in the reverse osmosis element decreases as a ratio of the length between the intersection points of the strands to the thickness of the feed spacer increases, and the ratio of the length between the intersection points of the strands to the thickness of the feed spacer is 4.49 or more, and
   an angle at one side of the intersection points of the first set of the plurality of strands and the second set of the plurality of strands is 75° to 80°.

2. The feed spacer of claim 1, wherein the lengths between the intersection points of the plurality of strands all are equal to one another.

3. A nozzle for forming a feed spacer for reducing differential pressure in a reverse osmosis element, the nozzle comprising:
   a dual structure comprising an outer nozzle and an inner nozzle that are in contact with each other;
   the outer nozzle comprises a first plurality of slots positioned along an inner circumference, and the inner nozzle comprises a second plurality of slots positioned along an outer circumference, so that the first plurality of slots and the second plurality of slots are positioned at a portion where the outer nozzle and the inner nozzle are in contact with each other;
   wherein each slot of the first plurality of slots and each slot of the second plurality of slots have a rhombic shape,
   wherein each slot of the first plurality of slots and each slot of the second plurality of slots are positioned so that a vertex of the rhombic shape points toward the portion where the outer nozzle and the inner nozzle are in contact with each other, and
   wherein the nozzle forms a feed spacer comprising a plurality of strands disposed in a mesh shape having predetermined intersection points, the plurality of strands forming a mesh having a two-layer structure, wherein a first set of the plurality of strands form a first layer, and a second set of the plurality of strands are disposed on the first layer forming a second layer, wherein a thickness of the feed spacer has a constant value of h,
   wherein a vertical cross section of each of the strands has a rhombic shape having four sides that meet to form four vertexes, and a thickness of the first set of strands and a thickness of the second set of strands has a constant value of h/2, measured from a first vertex to an opposite non-adjacent second vertex of the rhombic shape,
   a length between the intersection points between the strands is 3 to 5 mm, the differential pressure in the reverse osmosis element decreases as a ratio of the length between the intersection points of the strands to the thickness of the feed spacer increases, and the ratio of the length between the intersection points of the strands to the thickness of the feed spacer is 4.49 or more.

4. The nozzle of claim 3, wherein a length of the first plurality of slots and the second plurality of slots is adjustable.

5. The nozzle of claim 3, wherein each slot of the first plurality of slots and each slot of the second plurality of slots has a size that is adjustable.

* * * * *